United States Patent
Hsu et al.

(10) Patent No.: US 7,459,496 B2
(45) Date of Patent: Dec. 2, 2008

(54) COATING COMPOSITIONS HAVING IMPROVED STABILITY

(75) Inventors: Shui-Jen Raymond Hsu, Westlake, OH (US); Tina R. Dame, Brunswick, OH (US); Prashant Patel, Stow, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 432 days.

(21) Appl. No.: 11/212,264

(22) Filed: Aug. 26, 2005

(65) Prior Publication Data

US 2006/0047062 A1     Mar. 2, 2006

Related U.S. Application Data

(60) Provisional application No. 60/604,583, filed on Aug. 26, 2004.

(51) Int. Cl.
*C08K 3/08*       (2006.01)
(52) U.S. Cl. .................. 524/439; 524/440; 524/441; 524/547; 524/556; 524/558
(58) Field of Classification Search ................ 524/439, 524/440, 441, 547, 556, 558
See application file for complete search history.

(56) References Cited

U.S. PATENT DOCUMENTS

| | | | |
|---|---|---|---|
| 3,839,254 A | 10/1974 | Fang | |
| 3,926,874 A | 12/1975 | Petty et al. | |
| 4,243,565 A | 1/1981 | Nishino et al. | |
| 4,717,424 A | 1/1988 | Wilfinger et al. | |
| 5,104,922 A | 4/1992 | Chang | |
| 5,151,125 A | 9/1992 | Kuwajima et al. | |
| 5,320,673 A | 6/1994 | Carpenter | |
| 5,356,469 A | 10/1994 | Jenkins et al. | |
| 5,466,286 A * | 11/1995 | Briselli et al. | 106/404 |
| 5,540,768 A | 7/1996 | Yamamoto et al. | |
| 5,755,869 A | 5/1998 | Olson et al. | |
| 6,348,528 B1 | 2/2002 | Schlarb et al. | |
| 6,485,786 B2 | 11/2002 | Deng et al. | |
| 6,624,227 B1 | 9/2003 | Bruylants et al. | |
| 6,710,161 B2 | 3/2004 | Bardman et al. | |
| 6,730,733 B2 * | 5/2004 | Overbeek et al. | 524/515 |
| 6,765,459 B2 | 7/2004 | Hirai et al. | |

FOREIGN PATENT DOCUMENTS

| EP | 0393579 | 10/1990 |
|---|---|---|
| EP | 0458245 | 11/1991 |

* cited by examiner

*Primary Examiner*—Bernard Lipman
(74) *Attorney, Agent, or Firm*—Thoburn T. Dunlap

(57) ABSTRACT

This invention relates to waterbone coating compositions having improved compatability with metal pigments, i.e., improved shelf life and reduced gassing and gellation. The composition comprise at least one aqueous dispersion of (1) at least one emulsion copolymer polymerized from (a) at least one ethylenically unsaturated anionic monomer and (b) at least one other olefinically unsaturated monomer, said copolymer being made using at least one phosphate surfactant having at least one phosphorus acid group or salt thereof, said copolymer being crosslinked, and (2) at least one non-water soluble metal pigment. The compositions are useful in paints and other coatings.

19 Claims, No Drawings

US 7,459,496 B2

COATING COMPOSITIONS HAVING IMPROVED STABILITY

RELATED U.S. APPLICATION

This application claims the benefit of priority from U.S. provisional application Ser. No. 60/604,583, filed on Aug. 26, 2004.

FIELD OF THE INVENTION

This invention relates to waterborne coating compositions having improved stability in the presence of metal pigments, i.e., improved shelf life and reduced gassing and gellation. The compositions comprise at least one aqueous dispersion of (1) at least one emulsion copolymer polymerized from (a) at least one ethylenically unsaturated anionic monomer and (b) at least one other olefinically unsaturated monomer, said copolymer being made using at least one phosphate surfactant having at least one phosphorus acid group or salt thereof, said copolymer optionally being crosslinked, and (2) at least one non-water soluble metal pigment. The compositions are useful in paints and other coatings.

BACKGROUND OF THE INVENTION

Coating compositions containing metal flake pigmentation are useful for the production of the currently popular "glamour metallic" finishes upon the surfaces of cellular phones, handheld electronic game and media entertainment devices, automobile interiors, computer housings, TV cabinets, furniture, automobile bodies, and the like. Such metal pigments include, for example, aluminum flake, copper bronze flake, metal oxide coated mica, and the like. Recently, there has been an effort in the coating industry to reduce atmospheric emissions of volatile solvents released during the painting process. One approach to this end has been to develop waterborne coating compositions. Unfortunately, many of the waterborne coating compositions containing metal flake pigments are unstable because some metal pigments react with the aqueous medium to produce hydrogen gas. Such "gassing" may cause unsafe pressure buildups in painting and storage equipment, and can adversely affect the appearance of the applied coating. For example, Aluminum flake pigment is widely known for its ability to impart metallic luster to coating compositions in which it is used. While the aluminum flake pigments have proven readily useful in coating compositions based on organic solvent systems, difficulties have been encountered in attempting to use the same pigments in aqueous coating systems (e.g., paints). In aqueous medium, aluminum flake pigment undergoes a reaction with water with a concomitant evolution of hydrogen gas. This gassing can be especially troublesome when the coating composition containing the pigment is stored in sealed containers. The reaction with water, on one hand, can reduce or destroy the desired optical effect of the pigment and, on the other hand, the hydrogen gas formed can create high pressures within storage tanks and composition containers, not to mention the explosion hazard.

Due to the increasing demand for aqueous systems, a number of techniques have been proposed for inhibiting or reducing the attack on the pigment flakes by water. One technique involves encapsulating the aluminmum pigment with dense amorphous silica. Other techniques involve treating the pigment with vanadate, chromate, molybdate or organophosphate passivating compounds. However, coating, encapsulating, or passivating the metal pigment with the various coatings, encapulants and reagents above and those outlined below can deleteriously affect the optical properties of the pigment to such an extent as to render it undesirable for finishes requiring metallic luster or sheen. Additionally, when these treatments are used in large amounts to treat metal pigment particles in a coating, they can negatively affect other properties of the coating such as the coating's ability to adhere to a surface.

Compositions relating to improved stability of metal pigments in waterborne coatings includes the following:

U.S. Pat. No. 4,717,424 relates to the surface treatment of metal pigments with carboxy-alkylene phosphoric acid ester or carboxyl-alkaline phosphonic or phosphinic acid to improve the stability of metal pigments in aqueous coatings.

U.S. Pat. No. 5,104,922 relates to phosphated acrylic polymers made in solution polymerization to improve stability of aqueous aluminum flake dispersion.

U.S. Pat. No. 5,151,125 relates to the use of low molecular weight polymer containing a phosphate monomer to improve stability of metallic pigments.

U.S. Pat. No. 5,320,673 relates to the use of a dispersant with silane or phosphate frunctional groups made in solution polymerization to improve stability of metallic pigments in waterborne coating compositions.

U.S. Pat. No. 5,356,469 relates to the use of a heteropoly anion compound and a phosphosilicate to improve stability of metal pigment aqueous paste.

U.S. Pat. No. 5,540,768 relates to the use of molybdic acid and a phosphoric eater to stabilize aluminum pigments in water base metallic paints.

U.S. Pat. No. 5,755,869 relates to the use of fatty acid or a maleinized alpha-olefin modified gassing inhibitor to treat the surface of metal pigments and improve their stability in waterborne film-forming compositions.

U.S. Pat. No. 6,624,227 relates to the use of phosphonic acid reaction products as additives to improve stability of metallic pigments in aqueous coatings.

U.S. Pat. No. 6,485,786 relates to the use of phosphorus containing unsaturated monomers in emulsion polymers to improve the stain-blocking in aqueous coatings.

U.S. Pat. No. 6,710,161 relates to the use of phosphorus containing unsaturated monomers in emulsion polymers for aqueous metal coatings. U.S. Pat. No. 6,765,459 relates to the use of phosphorus containing unsaturated monomers in emulsion polymers to improve gloss and corrosion resistance in waterborne coatings.

SUMMARY OF THE INVENTION

This invention relates to waterborne pigment compositions and to coating compositions that exhibit improved compatibility with metal pigments, i.e., improved shelf life, reduced gassing and gellation, and improved luster.

An exemplary embodiment of this invention relates to waterborne coating compositions having improved compatability with metal pigments, i.e., improved shelf life and reduced gassing and gellation. The compositions comprise at least one aqueous dispersion of (1) at least one emulsion copolymer polymerized from (a) at least one ethylenically unsaturated anionic monomer and (b) at least one other olefinically unsaturated monomer, wherein said monomers are polymerized in the presence of at least one phosphate-containing surfactant having at least one phosphorus acid group or salt thereof, said copolymer optionally being crosslinked, and (2) at least one non-water soluble metal pigment. The compositions are useful in paints and other coatings.

Surprisingly, aqueous dispersions of polymers of the invention that are made in the presence of a phosphate surfactant exhibit improved stability toward metal pigments when compared to polymers that are made in the presence of non-phosphorous containing surfactants or polymer dispersions made in the presence of non-phosphorous containing surfactants with the post polymerization addition of phosphorous containing surfactants.

DETAILED DESCRIPTION OF THE INVENTION

The compositions of the present invention comprise at least one aqueous dispersion of (1) at least one emulsion copolymer polymerized from (a) at least one ethylenically unsaturated anionic monomer and (b) at least one other olefinically unsaturated monomer, said polymer being made using at least one phosphate-containing surfactant having at least one phosphorus acid group or salt thereof, said copolymer optionally being crosslinked, and (2) at least one non-water soluble metal pigment. The compositions are useful in paints and other coatings.

Ethylenically Unsaturated Anionic Monomer

As used herein, the term "ethylenically unsaturated anionic monomer" includes but is not limited to polymerizable acids, anhydrides, and the metal ion (e.g., Li, Na, K, Ca) and ammonium ion salts thereof. Non-limiting examples of suitable polymerizable ethylenically-unsaturated anionic monomers (a) include acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium salt of 2-acrylamido-2-methyl-1-propanesulfonic acid, ammonium salt of 2-acrylamido-2-methyl-1-propanesulfonic acid, sodium vinyl sulfonate, sodium salt of allyl ether sulfonate, phosphoethyl methacrylate, vinyl phosphonic acid, allyl phosphonic acid, and the like, and mixtures thereof. In one embodiment, methacrylic acid is used. In another embodiment, a mixture of methacrylic acid and the sodium salt of 2-acrylamido-2-methyl-1-propanesulfonic acid is used. The ethylenically unsaturated monomers can be polymerized in their ionic form (i.e., in the metal ion or ammonium salt form) or the repeating units polymerized from the anionic monomers can be neutralized or partially neutralized with an appropriate base (e.g., sodium hydroxide, ammonium hydroxide) subsequent to polymerization.

The total amount of ethylenically unsaturated anionic monomer and/or salt thereof typically ranges from about 0.5 wt. % to about 10 wt. % based upon total monomer weight. It has been found that less than about 0.5 wt. % of ethylenically unsaturated anionic monomer produces coating compositions that are unstable, i.e., that tend to solidify or form gels during heat stability testing.

Other Olefincally Unsaturated Monomer

At least one other olefinically unsaturated monomer (b) is copolymerized with the ethylenically unsaturated ionic monomer (a). Non-limiting examples of suitable monomer (b) include alkyl acrylates or methacrylates having from 1 to 10 carbon atoms in the alkyl moiety thereof (e.g., methyl, ethyl, isopropyl, n-propyl, n-butyl, isobutyl, t-butyl, or ethylhexyl ester of acrylic acid or methacrylic acid, such as methyl methacrylate, 2-ethylhexyl acrylate, and the like), glycidyl methacrylate, glycol mono- or diacrylates, glycol mono or dimethacrylates, aromatic vinyl compounds (e.g., styrene), vinyl halides (e.g., vinyl chloride and vinyl bromide), vinylidene chloride, and $C_1$-$C_{12}$ vinyl esters (e.g., vinyl acetate and vinyl propionate, and vinyl versatates), vinyl pyridine, N-vinyl pyrrolidone, amino monomers having non-reactive amino groups such as N,N'-dimethylamino (meth)acrylate, chloroprene, acrylonitrile, methacrylonitrile, and the like, and mixtures thereof. As used here and throughout the specification, it is to be recognized with respect to the various polymerizable monomers set forth herein that when the term "meth" is enclosed in parenthesis such as, for example, "(meth)acrylate" and "(meth)acrolein", is meant to include both the methyl and non-methyl substituted monomer (e.g., methacrylate and acrylate).

Furthermore, unsaturated carboxylic acid amides (e.g., acrylamide, methacrylamide, and itaconic acid amide), N-alkyl and/or N-alkylol derivatives of unsaturated carboxylic acid amides (e.g., N-methylacrylamide, N-isobutylacrylamide, N-methylolacrylamide, N-methylolmethacrylamide, and N-ethoxymethacrylamide), hydroxyl-containing unsaturated monomers (e.g., hydroxyethyl methacrylate and hydroxypropyl acrylate), and the like, and mixtures thereof can be used as unsaturated monomer (b).

Also suitable as monomer (b) are small amounts (typically less than about 1 wt. %) of polyfuctional ethylenically unsaturated monomers, including allyl-, vinyl-, and crotyl-esters of acrylic, methacrylic, maleic, and fumaric acids, di- and tri-(meth)acrylate derivatives, divinylbenzene, diallylphthalate, triallylcyanurate, polyvinyl ethers of glycols and glycerols, and the like, and mixtures thereof.

In one embodiment, a mixture of methyl methacrylate, 2-ethylhexyl acrylate, and 2-hydroxy ethyl acrylate is used. In another embodiment, methyl methacrylate, 2-ethylhexyl acrylate, 2-hydroxy ethyl acrylate, and styrene is used. In one embodiment, the amount of monomer (b) is about 90 wt. % to about 99.5 wt. % based upon total monomer weight. In another embodiment, the amount of monomer (b) is from about 0.5 wt. % to 10 wt. % based on total monomer weight.

In one embodiment of the present invention, ethylenically unsaturated monomers comprising carbonyl fuctional groups, which are known to be reactive with amines, are polymerized into the polymer backbone. Ethylenically unsaturated monomers having amine-reactive, carbonyl-functional groups include but are not limited to ketone- or aldehyde-functional ethylenically unsaturated monomers such as diacetone acrylamide, (meth)acryloxyalkyl benzophenone, (meth)acrolein, crotonaldehyde, and 2-butanone(meth)acrylate, as well as active methylene compounds such as the esters and amides of acetoacetic acid, and the like, and mixtures thereof. Non-limiting examples of esters and amides of acetoacetic acid include vinyl acetoacetate, acetoacetoxyethyl (meth)acrylate, acetoacetoxypropyl (meth)acrylate, allyl acetoacetate, acetoacetoxybutyl (meth)acrylate, 2,3-di (acetoacetoxy)propyl (meth)acrylate, vinyl acetoacetamide, acetoacetoxyethyl (meth)acrylamide, and the like, and mixtures thereof. In one embodiment, the range may be from about 0 wt. % to about 10 wt. % based on total monomer weight. In another embodiment, the range may be from about 1 wt. % to about 7 wt. % based on total monomer weight. As one skilled in the art will recognize, when one is employing the optional monomer comprising carbonyl functional groups, the amount of monomers (a) and (b) will be adjusted so that the total amount of monomers is 100 wt. %.

Phosphate Surfactant

Suitable phosphate surfactants for use in the present invention include those having at least one phosphate group, as well as salts thereof. Salts include but are not limited to sodium, potassium, lithium, and ammonium. Non-limiting examples of phosphate surfactants having at least one phosphate group and salts thereof include the mono- and di-phosphate esters of nonyl phenol ethoxylate, phosphate esters of tridecyl alcohol ethoxylate, phosphate esters of isodecyl ethoxylate, and other phosphate esters of aromatic ethoxylates and aliphatic ethoxylates, phosphate esters of $C_{10}$-$C_{16}$ alkyl ethoxylates/propoxylates and the like; and mixtures thereof. Another class of phosphate group containing surfactants includes phosphate esters of $C_{10}$-$C_{16}$ alkyl ethoxylates/propoxylates wherein the surfactant consists of at least 50% by weight of ethylene oxide and propylene oxide groups and the proportion of ethylene oxide groups and propylene oxide groups is in each case is at least 10% by weight, based on the overall amount of the ethylene oxide groups and propylene oxide groups. Such surfactants are described in U.S. Pat. No. 6,348,528 which is incorporated herein by reference.

Commercially available products include those listed in *McCutcheon's Emulsifiers and Detergents* (2004 *edition*), such as Rhodafac® PE-510, RE-410, RE-610, RE-960, RK-500A, RS-410, RS-610, RS-610A-25, RS-710, and RS-960 from Rhodia Inc.; Dextrol™ OC-110, OC-15, OC-40, OC-60, and OC-70 from Dexter Chemical L.L.C.; Tryfac® 5553 and 5570 from Cogis Corporation; Klearfac® AA 270, Lutensit® and Maphos® from BASF Corporation; and the like, and mixtures thereof. In one embodiment, Dextrol™ OC-110 (nonyl phenol ethoxylate phosphate ester) from Dexter Chemical L.L.C.) is used. In another embodiment, tridecyl alcohol ethoxylate phosphate ester (Dextrol™ OC-40 from Dexter Chemical L.L.C.) is used.

Non-limiting examples of other suitable phosphates having at least one phosphorus acid group and salts thereof include phosphorous-containing acids (e.g., phosphoric acid, phosphorous acid, hypophosphorous acid, orthophosphoric acid, pyrophosphoric acid, tripolyphosphoric acid, and metaphosphoric acid), monomethyl phosphate, monoethyl phosphate, mono n-butyl phosphate, dimethyl phosphate, diethyl phosphate, ethyl ester of phosphorous acid, and other esters of phosphorous-containing acids; and the like, and mixtures thereof. In one embodiment, Dextrol™ OC-40 is used. In another embodiment, Dextrol™ OC-100 is used.

In one embodiment, the amount of phosphate surfactant is from about 0.5 wt. % to about 10 wt. % based upon total monomer weight. In another embodiment, the amount of phosphate surfactant is from about 1 wt. % to about 4 wt. % based upon total monomer weight.

Polymerization; Other Additives

The emulsion polymerization is carried out in the conventional manner using well-known additives and ingredients, such as emulsifiers, free radical polymerization initiators, and the like, and mixtures thereof. Either thermal or redox initiation processes may be used. The reaction temperature typically is maintained at a temperature lower than about 100° C. throughout the course of the reaction. In one embodiment, a reaction temperature between about 30° C. and 95° C. is used. In another emobodiment, a reaction temperature between about 50° C. and about 90° C. is used. The monomer mixture may be added neat or as an emulsion in water. The monomer mixture may be added in one or more additions or continuously, linearly or not, over the reaction period, or combinations thereof.

pH control agents and buffers typically are used at the outset of the polymerization process in order to adjust pH. Typical initial reactor pH may be about 7 to about 10. However, other pH values may be obtained in particular applications using pH control agents and buffers well known to those skilled in the art. Non-limiting examples of suitable pH control agents include but are not limited to ammonium and alkali metal hydroxides (such as sodium hydroxide and potassium hydroxide), and mixtures thereof, and the like. Non-limiting examples of suitable buffers include ammonium carbonate, sodium carbonate, sodium bicarbonate, and mixtures thereof, and the like. pH may be adjusted if desired at the end of the polymerization process according to the desired application.

Beside surfactants described above, other surfactants also may be used as co-surfactants in emulsion polymerization. These co-surfactants include anionic or nonionic emulsifiers and mixtures thereof. Typical anionic emulsifiers include alkali or ammonium alkyl sulfates, alkyl sulfonates, salts of fatty acids, esters of sulfosuccinic acid salts, alkyl diphenylether disulfonates, and the like, and mixtures thereof. Typical nonionic emulsifiers include polyethers, e.g., ethylene oxide and propylene oxide condensates, including straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides; and the like, and mixtures thereof. Co-surfactants typically are employed in the compositions of the present invention at levels of about 0 wt. % to about 3 wt. % or greater, based on total monomer weight.

In preparing the copolymer component, any chain-transfer agent, or mixtures thereof, may be used to control molecular weight. Suitable chain transfer agents include, for example, $C_1$ to $C_{12}$ alkyl or functional alkyl mercaptans, alkyl or functional alkyl mercaptoalkanoates, or halogenated hydrocarbons, and the like, and mixtures thereof. Chain transfer agents typically are employed at levels of about 0.1 to about 10 wt %, based on total monomer weight.

The copolymers typically are prepared in the presence of water-soluble or oil-soluble initiators (such as persulfates, peroxides, hydroperoxides, percarbonates, peracetates, perbenzoates, azo-functional compounds, and other free-radical generating species, and the like, and mixtures thereof, as is well known to those skilled in the art.

Chelating agents may be used in emulsion polymerization processes to provide stability, as is well known to those skilled in the art. Such agents include those having multifunctional polar groups capable of complexing with metal ions. Non-limiting examples of suitable chelating agents useful in the present invention include but are not limited to: phosphoric acid, phosphates and polyphosphates; n-phosphonoalkyl-n-carboxylic acids; gem-diphosphono-alkanes and gem-diphosphonohydroxyalkanes; compounds containing one or more aminedi(methylenephosphonic acid) moieties, such as aminotris(methylenephosphonic acid), ethylenediaminetetrakis(methylenephosphonic acid), and diethylenetriamine-N,N,N',N",N"-penta(methyleenephosphonic acid); compounds containing one or more aminedi(methylenecarboxylic acid) moieties, such as N-(2-hydroxyethyl) ethylenediaminetriacetic acid ("HEDTA"), ethylenediaminetetraacetic acid ("EDTA"), and nitrilotris (methylenecarboxylic acid); as well as their alkali metal and ammonium salts; and the like, and mixtures thereof. Such agents typically are used in an amount from about 0 wt. % to about 5 wt. % based on total monomer weight.

Crosslinker

Any nitrogen-containing compound having at least two amine nitrogens reactive with carbonyl groups may be employed as a crosslinking agent in the present invention. The crosslinker may be added during the polymerization process or post-added during processing of the dispersion or during formulation of the coating compositions. Such crosslinking agents may be aliphatic or aromatic, polymeric or non-polymeric, and may be used alone or in combination. Non-limiting examples of suitable compounds include: ethylenediamine, propylenediamine, tetramethylenediamine, pentamethylenediamine, hexamethylenediamine, piperazine, aminoethylpiperazine, diethylenetriamine, triethylenetetramine, tetraethylenepentamine, cyclohexyldiamine, isopheronediamine, triaminoethylamine, diaminoethanolamine, phenylenediamine, and biphenyldiamine, hydrazine, aliphatic dihydrazines having from 2 to 4 carbon atoms such as but not limited to ethylene-1,2-dihydrazine, propylene-1,3-dihydrazine, and butylene-1,4-dihydrazine), alkylene dioxime ethers, and water soluble dihydrazides of dicarboxylic acids (for example, dihydrizides of malonic, succinic, and adipic acids). In one embodiment, the dihydrazide of adipic acid (adipic acid dihydrazide) is used.

In one embodiment, the crosslinking agent is used in an amount sufficient to react with about 0.25 to about 1 carbonyl mole equivalents present in the copolymer. In another embodiment, the crosslinking agent is used in an amount sufficient to react with at least about 0.5 to about 1 carbonyl mole equivalents present in the copolymer.

In this invention, the glass transition temperature ("Tg") of the emulsion copolymer should be maintained below about 90° C. Tg's used herein are those calculated by using the Fox equation; see T. G. Fox, *Bull. Am. Physics Soc., Volume* 1, Issue No. 3, page 123, (1956). In other words, for calculating the Tg of a copolymer of monomers M1 and M2, $$1/Tg(calc.) = w(M1)/Tg(M1) + w(M2)/Tg(M2), \text{ wherein}$$

Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, with all temperatures being in degrees K.

Glass transition temperatures of homopolymers may be found, for example, in J. Brandrup and E. H. Immergut, ed., *Polymer Handbook*, Interscience Publishers.

When the emulsion polymers were made by various processes to create core-shell or non-uniform monomer distribution in the particles or multi-modal paticle distribution or other morphology, the Tg calculation is based on the total monomers used in the polymerization, regardless of the sequence of monomer additions.

Non-Water Soluble Metal Pigments

The metal pigments are insoluble in water. Suitable non-water soluble metal pigments include metals such as aluminum, copper, silver, zinc, and the like, and alloys thereof, such as bronze, and the like. Such pigments are produced by methods known to those skilled in the art, such as grinding or milling using a grinding agent in the presence of a grinding medium such as a ball mill or attritor mill. In one embodiment, the metallic pigments are used in flake or powder form. In another embodiment, aluminum flakes or powder are used.

In one embodiment, the amount of such compound is about 1 wt. % to about 6 wt. % based on total formulation weight. In another embodiment, the amount of such compound is about 1 wt. % to about 3 wt. % based on total formulation weight.

Coatings and Other Compositions

Other optional components that may be included in this invention include co-solvents, pigments, fillers, dispersants, wetting agents, anti-foam agents, thickeners (rheology modifiers), pH control agents, UV absorbers, antioxidants, biocides, and stabilizers, as is well known to those skilled in the art.

The coating compositions of the present invention can be applied to a substrate by any conventional coating technique, such as brushing, dip-coating, flowing, and spraying. In one embodiment, spray application is used to give superior gloss. Any of the conventional spraying techniques can be employed, such as compressed air spraying, electronic spraying, and other manual or automatic methods known to those skilled in the art. Once applied to a substrate, the coating compositions can be cured at ambient or elevated temperatures as is well known to those skilled in the art.

The coating compositions of the present invention have improved stability, including improved shelf life and reduced gassing (also known in the art as "outgassing") and reduced gellation. In addition, the luster of the cured coatings is markedly improved over compositions of the prior art. "Gellation" refers to increased viscosity of the coating compositions during storage.

The coating compositions of the present invention can be used to provide coatings on suitable substrates such as wood and reconstituted wood products, concrete, asphalt, fiber cement, stone, marble, clay, plastics (for example, polystyrene, polyethylene, ABS, polyurethane, polyethylene terephthalate, polybutylene terephthalate, polypropylene, polyphenylene, polycarbonate, polyacrylate, PVC, Noryl®, and polysulfone), paper, cardboard, and metal (ferrous as well as non-ferrous). In one embodiment, the substrate is ABS.

EXAMPLES

Test Methods

Stability (Oven and Room Temperature)

All samples were adjusted to the same pH value using dimethyl ethanol amine to a pH of 8.0±0.2 and approximate viscosity, 25±5 secs on #3 Zahn cup, via addition of alkali swellable thickener (Viscalex LO-30) and aged overnight at room temperature (approximately 25° C. before being aged further at room temperature or in an oven. Initial viscosities of all samples following overnight aging were measured as controls using a Zahn cup #3, and all aged samples were tested at the same temperature. 150 Grams of each sample was placed in an oven (STABIL-THERM® Constant Temperature Cabinet with POWER-O-MATIC 70™) from the BLUE M Electric Company, set at 120° F. Each sample was removed from the cabinet every seventh day and allowed four hours to reach ambient temperature before viscosity measurement using a Zahn cup #3. This testing procedure was followed for a total of 28 days. Any sample with a viscosity rise of 10 seconds or more was classified as a failure. The same procedure was used for room temperature (approximately 25° C.) testing except for placement in the cabinet.

Viscosity (Zahn Cup)

The cup to be used was selected according to the expected viscosity range of the sample. Selection of the cup was made using a specification table and testing done using written instructions provided by the manufacturer, Paul N. Gardner. The cup was inspected to be sure that it was clean and that there was no residual dried material in or around the orifice. The temperature of the sample was allowed to equilibrate to room temperature over a period of 4 hours. The cup was immersed completely in the sample to be measured by means of a stainless steel split key ring. The temperature of the sample encompassed by the cup was measured and recorded. The cup was held vertically by inserting an index finger into the cup's handle ring, and the cup was lifted in a quick, steady motion out of the sample. A timer was started when the top edge of the cup broke the surface. The cup was held no more than six inches above the level of the sample during sample flow time. The timer was stopped when the first definite break in the sample stream at the base of the cup was observed. The number of seconds of efflux time was recorded, together with the temperature and the cup number. The cup was cleaned promptly following each use, unless it was used immediately for a rerun of the same sample.

Chemicals List

Additol® XL 250=anionic dispersant from Solutia Inc.
Aerosol® OT-75=dioctyl sulfosuccinate from Cytec Company.
Aqua Paste® 504-C33=inhibited aluminum pigment from Silberline Manufacturing Co., Inc.
Ammonium hydroxide=28 wt. % solution in water.
AMPS® 2405=sodium salt of 2-acrylamido-2-methylpropane sulfonic acid from The Lubrizol Corporation.
Calfax® R-9093=ammonium salt of hexadecyl diphenyl oxide disulfonic acid from Pilot Chemical Company
Dextrol™ OC-40=tridecyl alcohol ethoxylate phosphate ester from Dexter Chemical L.L.C.
Dextrol™ OC-110=nonyl phenol ethoxylate phosphate ester from Dexter Chemical L.L.C.
Dowanol® DPM=dipropylene glycol monomethyl ether from Dow Chemical Company.
Dowfax® 2A1=sodium salt of dodecyl diphenyl oxide disulfonic acid from Dow Chemical Company.
Polystep 18S=Linear sodium alpha olefin sulfonate from Stepan Company.
Proxel® GXL=biocide from Aevcia Inc.
Rhodacal® DS-4=sodium dodecyl benzene sulfonate from Rhodia Inc.
Rhodaplex™ CO-436=ammonium salt of alkylphenol ethoxylate sulfate from Rhodia Inc.
Sipomer® PAM-100=a phosphorus acid monomer from Rhodia Inc.
Sipon™ L-22=ammonium lauryl sulfate from Rhodia Inc.
Sparkle Silver® Premier 504-AR untreated aluminum paste from Silberline Manufacturing Co., Inc.
T-Mulz® 1228M=phosphate ester of 2-hydroxylethyl methacrylate from Harcros Chemicals Inc.
Surfynol® CT-136=a proprietary surfactant blend from Air Products and Chemicals, Inc.
Viscalex® LO-30=alkali swellable thickener from Ciba Specialty Chemicals Water Treatements Limited.

Preparation of Copolymers

Examples 1 to 17 illustrate preparation and/or testing of coating compositions comprising the copolymers of the present invention and an aluminum pigment. The term "wt. %" as used in the following examples means percentage by weight in an aqueous solution unless stated otherwise.

Example 1

An emulsion polymer of methacrylic acid, 2-hydroxylethyl acrylate, methyl methacrylate, and 2-ethylhexyl acrylate was made by using a phosphate surfactant. A monomer premix was made by mixing 224 grams of water, 0.8 grams of ammonium carbonate, 1.07 grams of ammonium lauryl sulfate (Sipon™ L-22), 6.4 grams of nonyl phenol ethoxylate phosphate ester (Dextrol™ OC-110), 24 grams of methacrylic acid, 15.2 grams of 2-hydroxylethyl acrylate, 488 grams of methyl methacrylate, and 272.8 grams of 2-ethylhexyl acrylate. Initiator A was made by dissolving 0.8 grams of ammonium persulfate in 8 grams of water. Initiator B was made by dissolving 1.2 grams of ammonium persulfate in 80 grams of water. 760 grams of water, 8 grams of nonyl phenol ethoxylate phosphate ester (Dextrol™ OC-110), 0.72 grams of ammonium carbonate, and 1.29 grams of 28 wt. % ammonium hydroxide were charged to a 3-liter reaction vessel and heated to 80° C. Initiator A was then added to the reaction vessel, followed by proportioning the monomer premix to the reaction vessel over a period of about 3 hours. 45 minutes after premix proportioning started, initiator B was proportioned into the reaction vessel over a period of about 3 hours and 30 minutes. When the proportion of monomer premix was complete, 16 grams of water was used to flush the premix vessel. After completion of initiator B feed, the temperature of the reaction vessel was maintained at 80° C. for 30 minutes. The reaction vessel then was cooled to 57° C. 2.35 grams of 17 wt. % aqueous solution of t-butyl hydroperoxide and 24.64 grams of 2.6 wt. % erythorbic acid were added to the reaction vessel about 5 minutes apart. After 30 minutes, the reaction vessel was cooled to room temperature and filtered through 100-micron cloth. The pH of the product emulsion was adjusted to 8.5-9.0 before use.

Example 2

The emulsion polymer was made in the same way as Example 1, except that a non-phosphate surfactant—ammonium salt of alkylphenol ethoxylate sulfate (Rhodaplex™ CO-436)—was used instead of nonyl phenol ethoxylate phosphate ester (Dextrol™ OC-110).

Example 3

An emulsion polymer of methacrylic acid, methyl methacrylate, 2-ethylhexyl acrylate, styrene, diacetone acrylamide and AMPS® 2405 was made by using a phosphate surfactant. A monomer premix was made by mixing 216 grams of water, 45.6 grams of diacetone acrylamide, 1.07 grams of ammonium lauryl sulfate (Sipon™ L-22), 0.64 grams of ammonium carbonate, 9.6 grams of nonyl phenol ethoxylate phosphate ester (Dextrol™ OC-110), 4 grams of methacrylic acid, 453.6 grams of methyl methacrylate, 88.8 grams of 2-ethylhexyl acrylate and 200 grams of styrene. Initiator A was made by dissolving 0.8 grams of ammonium persulfate in 13.3 grams of water. Initiator B was made by dissolving 1.2 grams of ammonium persulfate in 80 grams of water. 592 grams of water, 4.8 grams of Dextrol™ OC-110, 0.72 grams of ammonium carbonate, and 1.91 grams of 28 wt. % ammonium hydroxide were charged to a 3-liter reaction vessel and heated to 80° C. Initiator A then was added to the reaction vessel, followed by proportioning the monomer premix to the reaction vessel over a period of about 3 hours. 30 minutes after premix proportioning started, the premix proportioning was stopped for 15 minutes. 16 grams of sodium salt of 2-acrylamido-2-methylpropanesulfonic acid (AMPS® 2405) and 24 grams of water were added to the remaining monomer premix. After the 15-minute stop, the monomer premix proportioning was resumed. At the same time, initiator B was proportioned into the reaction vessel over a period of about 3 hours and 30 minutes. After completion of initiator B feed, the temperature of the reaction vessel was maintained at 80° C. for 30 minutes. The reaction vessel then was cooled to 57° C. Aqueous solution of 5.5 wt. % t-butyl hydroperoxide was added to the reaction vessel. After about 5 minutes, aqueous solution of 2.4 wt. % erythorbic acid was added to the reaction vessel. After 30 minutes, the reaction vessel was cooled to room temperature and filtered through 100-micron cloth. Then an aqueous solution of adipic acid dihydrazide (128 grams of 17.8 wt. % adpic acid dihydrazide aqueous solution), ammonium hydroxide, and Proxel® GXL was added. The product had a pH of about 8.5.

Example 4

An emulsion polymer of methacrylic acid, methyl methacrylate, 2-ethylhexyl acrylate, styrene, diacetone acrylamide and AMPS® 2405 was made by using a phosphate surfactant. A monomer premix was made by mixing 216 grams of water, 45.6 grams of diacetone acrylamide, 1.07 grams of ammonium lauryl sulfate (Sipon™ L-22), 0.64 grams of ammonium carbonate, 9.6 grams of tridecyl alcohol ethoxylate phosphate ester (Dextrol™ OC-40), 4 grams of methacrylic acid, 453.6 grams of methyl methacrylate, 88.8 grams of 2-ethylhexyl acrylate and 200 grams of styrene. Initiator A was made by dissolving 0.8 grams of ammonium persulfate in 13.3 grams of water. Initiator B was made by dissolving 1.2 grams of ammonium persulfate in 80 grams of water. 592 grams of water, 4.8 grams of Dextrol™ OC-40, 0.72 grams of ammonium carbonate, and 1.91 grams of 28 wt. % ammonium hydroxide were charged to a 3-liter reaction vessel and heated to 80° C. Initiator A then was added to the reaction vessel, followed by proportioning the monomer premix to the reaction vessel over a period of about 3 hours. 30 minutes after premix proportioning started, the premix proportioning was stopped for 15 minutes. 16 grams of sodium salt of 2-acrylamido-2-methylpropanesulfonic acid (AMPS® 2405) and 24 grams of water were added to the remaining monomer premix. After the 15-minute stop, the monomer premix proportioning was resumed. At the same time, initiator B was proportioned into the reaction vessel over a period of about 3 hours and 30 minutes. After completion of initiator B feed, the temperature of the reaction vessel was maintained at 80° C. for 30 minutes. The reaction vessel then was cooled to 57° C. Aqueous solution of 5.5 wt. % t-butyl hydroperoxide was added to the reaction vessel. After about 5 minutes, aqueous solution of 2.4 wt. % erythorbic acid was added to the reaction vessel. After 30 minutes, the reaction vessel was cooled to room temperature and filtered through 100-micron cloth. Then an aqueous solution of adipic acid dihydrazide (128 grams of 12.5 wt. % adpic acid dihydrazide aqueous solution), ammonium hydroxide, and Proxel® GXL was added. The product had a pH of about 8.5.

Example 5

The emulsion polymer was made in the same way as Example 4, except that a non-phosphate surfactant—ammonium salt of hexadecyl diphenyl oxide disulfonic acid (Calfax® R-9093)—was used instead of tridecyl alcohol ethoxylate phosphate ester (Dextrol™ OC-40), and ammonium hydroxide was not used in the reactor.

Example 6

The emulsion polymer was made in the same way as Example 4, except that a non-phosphate surfactant—ammonium lauryl sulfate—was used instead of tridecyl alcohol ethoxylate phosphate ester (Dextrol™ OC-40), and ammonium hydroxide was not used in the reactor.

Example 7

The emulsion polymer was made in the same way as Example 4, except that a non-phosphate surfactant—sodium alpha olefin sulfonate was used instead of tridecyl alcohol ethoxylate phosphate ester (Dextrol™ OC-40), and ammonium hydroxide was not used in the reactor.

Example 8

The emulsion polymer was made in the same way as Example 4, except that a non-phosphate surfactant—sodium dioctyl sulfosuccinate (Aerosol® OT-75)—was used instead of tridecyl alcohol ethoxylate phosphate ester (Dextrol™ OC-40), and ammonium hydroxide was not used in the reactor.

Example 9

The emulsion polymer was made in the same way as Example 4, except that a non-phosphate surfactant—sodium dodecyl benzene sulfonate (Rhodacal® DS-4)—was used instead of tridecyl alcohol ethoxylate phosphate ester (Dextrol™ OC-40), and ammonium hydroxide was not used in the reactor.

Example 10

The emulsion polymer was made in the same way as Example 4, except that a non-phosphate surfactant—ammonium salt of alkylphenol ethoxylate sulfate (Rhodaplex™ CO-436) was used instead of tridecyl alcohol ethoxylate phosphate ester (Dextrol™ OC-40), and ammonium hydroxide was not used in the reactor.

Example 11

The emulsion polymer was made in the same way as Example 4, except that a non-phosphate surfactant—sodium salt of dodecyl diphenyl oxide disulfonic acid (Dowfax® 2A1) was used instead of tridecyl alcohol ethoxylate phosphate ester (Dextrol™ OC-40), and ammonium hydroxide was not used in the reactor.

Example 12

An emulsion polymer of methacrylic acid, methyl methacrylate, 2-ethylhexyl acrylate, styrene, diacetone acrylamide and a phosphate monomer (Sipomer® PAM-100) was made by using a phosphate surfactant. A monomer premix was made by mixing 459 grams of water, 32.3 grams of diacetone acrylamide, 2.27 grams of ammonium lauryl sulfate (Sipon™ L-22), 1.36 grams of ammonium carbonate, 20.4 grams of tridecyl alcohol ethoxylate phosphate ester (Dextrol™ OC-40), 8.5 grams of methacrylic acid, 911.2 grams of methyl methacrylate, 306 grams of 2-ethylhexyl acrylate and 425 grams of styrene. Initiator A was made by dissolving 1.7 grams of ammonium persulfate in 28.32 grams of water. Initiator B was made by dissolving 2.55 grams of ammonium persulfate in 170 grams of water. 1258 grams of water, 10.2 grams of Dextrol OC-40, 1.53 grams of ammonium carbonate, and 4.068 grams of 28 wt. % ammonium hydroxide were charged to a 5-liter reaction vessel and heated to 80° C. Initiator A then was added to the reaction vessel, followed by proportioning the monomer premix to the reaction vessel over a period of about 3 hours. 30 minutes after premix proportioning started, the premix proportioning was stopped for 15 minutes. 17 grams of PAM-100 and 51 ggrams of water were added to the remaining monomer premix. After the 15-minute stop, the monomer premix proportioning was resumed. At the same time, initiator B was proportioned into the reaction vessel over a period of about 3 hours and 30 minutes. When the proportioning of monomer premix was complete, 102 grams of water was used to flush the premix vessel. After completion of initiator B feed, the temperature of the reaction vessel was maintained at 80° C. for 30 minutes. The reaction vessel then was cooled to 57° C. Aqueous solution of 5.5% t-butyl hydroperoxide was added to the reaction vessel. After about 5 minutes, an aqueous solution of 2.4% erythorbic acid was added to the reaction vessel. After 30 minutes, the reaction vessel was cooled to room temperature and filtered through 100-micron cloth. Then an aqueous solution of adipic acid dihydrazide (249.73 grams of 4.7 wt. % adpic acid dihydrazide aqueous solution), ammonium hydroxide, and Proxel® GXL was added. The product had a pH of about 8.5. The product had a pH of about 8.5.

Example 13

An emulsion polymer of methacrylic acid, methyl methacrylate, 2-ethylhexyl acrylate, styrene, diacetone acrylamide and a phosphate monomer (Sipomer® PAM-100) was made by using a phosphate surfactant. A monomer premix was made by mixing 432 grams of water, 75.2 grams of diacetone acrylamide, 2.13 grams of ammonium lauryl sulfate (Sipon™ L-22), 1.28 grams of ammonium carbonate, 19.2 grams of tridecyl alcohol ethoxylate phosphate ester (Dextrol™ OC-40), 8.0 grams of methacrylic acid, 820 grams of methyl methacrylate, 280 grams of 2-ethylhexyl acrylate and 400 grams of styrene. Initiator A was made by dissolving 1.6 grams of ammonium persulfate in 26.66 grams of water. Initiator B was made by dissolving 2.40 grams of ammonium persulfate in 160 grams of water. 1184 grams of water, 9.6 grams of Dextrol™ OC-40, 1.44 grams of ammonium carbonate, and 3.829 grams of 28 wt. % ammonium hydroxide were charged to a 5-liter reaction vessel and heated to 80° C. Initiator A then was added to the reaction vessel, followed by proportioning the monomer premix to the reaction vessel over a period of about 3 hours. 30 minutes after premix proportioning started, the premix proportioning was stopped for 15 minutes. 17 grams of PAM-100 and 51 grams of water were added to the remaining monomer premix. After the 15-minute stop, the monomer premix proportioning was resumed. At the same time, initiator B was proportioned into the reaction vessel over a period of about 3 hours and 30 minutes. When the proportion of monomer premix was complete, 96 grams of water was used to flush the premix vessel. After completion of initiator B feed, the temperature of the reaction vessel was maintained at 80° C. for 30 minutes. The reaction vessel then was cooled to 57° C. Aqueous solution of 5.5% t-butyl hydroperoxide was added to the reaction vessel. After about 5 minutes, aqueous solution of 2.4% erythorbic acid was added to the reaction vessel. After 30 minutes, the reaction vessel was cooled to room temperature and filtered through 100-micron cloth. Then an aqueous solution of adipic acid dihydrazide (251.3 grams of 10.83 wt. % adpic acid dihydrazide aqueous solution), ammonium hydroxide, and Proxel® GXL was added. The product had a pH of about 8.5. The product had a pH of about 8.5.

Example 14

An emulsion polymer of methacrylic acid, methyl methacrylate, 2-ethylhexyl acrylate, styrene, diacetone acrylamide and T-Mulz® 1228M was made by using a phosphate surfactant. A monomer premix was made by mixing 216 grams of water, 45.6 grams of diacetone acrylamide, 1.07 grams of ammonium lauryl sulfate (Sipon™ L-22), 0.64 grams of ammonium carbonate, 9.6 grams of nonyl phenol ethoxylate phosphate ester (Dextrol™ OC-40), 4 grams of methacrylic acid, 453.6 grams of methyl methacrylate, 88.8 grams of 2-ethylhexyl acrylate and 200 grams of styrene. Initiator A was made by dissolving 0.8 grams of ammonium persulfate in 13.3 grams of water. Initiator B was made by dissolving 1.2 grams of ammonium persulfate in 80 grams of water. 592 grams of water, 4.8 grams of Dextrol T OC-110, 0.72 grams of ammonium carbonate, and 1.914 grams of 28 wt. % ammonium hydroxide were charged to a 3-liter reaction vessel and heated to 80° C. Initiator A then was added to the reaction vessel, followed by proportioning the monomer premix to the reaction vessel over a period of about 3 hours. 30 minutes after premix proportioning started, the premix proportioning was stopped for 15 minutes. A mixture of 8 grams of phosphate ester of 2-hydroxylethyl methacrylate (T-Mulz® 1228M), 6.8 grams of 28 wt % aqueous ammonia and 24 grams of water was added to the remaining monomer premix. It was followed by 24 grams of water flush. After the 15-minute stop, the monomer premix proportioning was resumed. At the same time, initiator B was proportioned into the reaction vessel over a period of about 3 hours and 30 minutes. When the proportioning of monomer premix was complete, 24 grams of water was used to flush the premix vessel. After completion of initiator B feed, the temperature of the reaction vessel was maintained at 80° C. for 30 minutes. The reaction vessel then was cooled to 57° C. Aqueous solution of 5.5% t-butyl hydroperoxide was added to the reaction vessel. After about 5 minutes, aqueous solution of 2.4% erythorbic acid was added to the reaction vessel. After 30 minutes, the reaction vessel was cooled to room temperature and filtered through 100-micron cloth. Then an aqueous solution of adipic acid dihydrazide (128 grams of 12.5 wt. % adpic acid dihydrazide aqueous solution), ammonium hydroxide, and Proxel® GXL was added. The product had a pH of about 8.5. The product had a pH of about 8.5.

Example 15

100 grams of the emulsion polymer composition of Example 9 was formulated with 4 grams of a phosphate surfactant (Dextrol OC-1025 an ammonium salt form of Dextrol OC-110) to determine if the post polymerization addition of a phosphate surfactant positively affected the stability properties of the coating composition.

Example 16

100 grams of the emulsion polymer composition of Example 10 was formulated with 4 grams of a phosphate surfactant (Dextrol OC-1025 an ammonium salt form of Dextrol OC-110) to determine if the post polymerization addition of a phosphate surfactant positively affected the stability properties of the coating composition.

Example 17

100 grams of the emulsion polymer composition of Example 11 was formulated with 4 grams of a phosphate surfactant (Dextrol OC-1025 an ammonium salt form of Dextrol OC-110) to determine if the post polymerization addition of a phosphate surfactant positively affected the stability properties of the coating composition.

Formulation of Copolymer/Pigment Samples

All copolymer samples were compounded using a standard lab mixer (in this case a Heidolph Type RZR 1) in a clear formulation. The clear formulation was made by placing the copolymer in a lab vessel and adding a premix (the components and amounts of which are listed in "Clear Formula" below) of Dowanol® DPM, Surfynol® CT-163, and water, under agitation. The compounds were then placed in a 120° F. oven for 24 hours to determine initial stability. The compounds were considered stable if no increase in viscosity was observed. The amount of Dowanol® DPM in the premix used was determined by the minimum film forming temperature ("MFFT") of the polymer using ASTM D 2354-91. This method prevented using an excess of solvent in the polymer. This was done by determining the needed solvent level based on the MFFT. The higher the MFFT, the more Dowanol® DPM (in the premix) was added. Samples with an MFFT of 30-40° C. used 8.5% Dowanol® DPM (in the premix), MFFT of 41-60° C. used 11.75% Dowanol® DPM (in the premix), and MFFT of 61-90° C. used 15% Dowanol® DPM (in the premix).

Clear Formula

| | |
|---|---|
| Copolymer (42 wt. % total solids in water) | 73-75 wt. % |
| Water | 10-15 wt. % |
| Surfynol® CT-136 | 0.2-0.3 wt. % |
| Dowanol® DPM | 8.5-15 wt. % |

The compounds which remained liquid were further compounded with Viscalex® LO-30, an untreated and treated (with inhibitor) aluminum pigment (either Sparkle Silver® Premier 504-AR or Aqua Paste® 504-C33 respectively), and dimethylethanolamine. The "Final Formulation", consisted of the above "Clear Formula", an aluminum pigment slurry (made by combining Dowanol® DPM, Additol® XL 250, and one of the above mentioned aluminum pigments under slight agitation), Viscalex® LO-30, and dimethylethanolamine to form the "Final Formulation" below:

Final Formulation

| | |
|---|---|
| Copolymer (42 wt. % total solids in water) | 66-67 wt. % |
| Water | 10-20 wt. % |
| Surfynol® CT-136 | 0.2-0.3 wt. % |
| Dowanol® DPM | 8-15 wt. % |
| Viscalex® LO-30 | 1-2 wt. % |
| Additol® XL 250 | 0.1-0.2 wt. % |
| Aluminum Pigment | 1-2 wt. % |
| Dimethylethanolamine | 0.2-0.3 wt. % |

Table 1 summarizes stability test results as measured by viscosity using the Zahn cup procedure. Example numbers correspond to the polymerization example numbers set forth heretofore, with the polymeric dispersion of each example having been formulated further as set forth immediately heretofore.

The terms "RT" and "OS" in the left-hand column of Table 1 (under the "Example" heading) refer to room temperature and oven stability respectively, measured using the viscosity stability (oven and room temperature) test method described heretofore. The terms "U" and "T" in the left-hand column of each of Tables 1 and 2 refer to untreated and treated aluminum pigments defined in the "Chemicals List" heretofore and used in examples as indicated. The terms "1 wk", "2 wk", "3 wk" and "4 wk" refer to the number of weeks of aging at either room temperature or in the oven, prior to testing using the Zahn cup viscosity test method described heretofore.

Zahn cup viscosity test results are described for each example as the number of seconds of increase in viscosity over the respective control sample before aging began. For example, "0" indicates no increase in viscosity following a given aging period, and "+7" indicates a seven second increase in viscosity following a given aging period. Any sample that had increased in viscosity greater than 10 seconds on a Zahn cup #3 was considered a failure and was marked "Fail". Asterisks refer to comments in footnotes.

Viscosity testing results in Table 1 for Examples 1, 3 and 4 show the effect of phosphate surfactants in producing pigmented coating compositions having satisfactory stability after aging at room temperature and in an oven. Example 2 shows that use of a non-phosphate surfactant and untreated aluminum pigment failed both room temperature and oven stability testing. Examples 5 to 11 show that a non-phosphate surfactant caused the pigmented coating compositions to fail both room temperature and oven stability testing.

TABLE 1

Viscosity Test Results for Copolymer/Pigment Samples

| Exa. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| RT-U 1 wk | 0 | 0 | 0 | 0 | Fail | Fail | Fail | Fail | Fail | Fail | Fail | 0 | 0 | 0 | Fail | Fail | Fail |
| RT-U 2 wk | 0 | +4 | 0 | 0 | Fail | Fail | Fail | Fail | Fail | Fail | Fail | 0 | 0 | 0 | Fail | Fail | Fail |
| RT-U 3 wk | 0 | +4 | 0 | 0 | Fail | Fail | Fail | Fail | Fail | Fail | Fail | 0 | 0 | 0 | Fail | Fail | Fail |
| RT-U 4 wk | 0 | Fail* | 0 | 0 | Fail | Fail | Fail | Fail | Fail | Fail | Fail | 0 | 0 | 0 | Fail | Fail | Fail |

TABLE 1-continued

Viscosity Test Results for Copolymer/Pigment Samples

| Exa. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| RT-T 1 wk | 0 | 0 | 0 | 0 | Fail | Fail | Fail | Fail | Fail | Fail | Fail | 0 | 0 | 0 | Fail | Fail | Fail |
| RT-T 2 wk | 0 | 0 | 0 | 0 | Fail | Fail | Fail | Fail | Fail | Fail | Fail | 0 | 0 | 0 | Fail | Fail | Fail |
| RT-T 3 wk | 0 | 0 | 0 | 0 | Fail | Fail | Fail | Fail | Fail | Fail | Fail | 0 | 0 | 0 | Fail | Fail | Fail |
| RT-T 4 wk | 0 | 0 | 0 | 0 | Fail | Fail | Fail | Fail | Fail | Fail | Fail | 0 | 0 | 0 | Fail | Fail | Fail |
| OS-U 1 wk | 0 | Fail | 0 | 0 | Fail | Fail | Fail | Fail | Fail | Fail | Fail | 0 | 0 | +2 | Fail | Fail | Fail |
| OS-U 2 wk | 0 | Fail | 0 | 0 | Fail | Fail | Fail | Fail | Fail | Fail | Fail | 0 | +2 | +3 | Fail | Fail | Fail |
| OS-U 3 wk | 0 | Fail | 0 | 0 | Fail | Fail | Fail | Fail | Fail | Fail | Fail | 0 | +3 | +3 | Fail | Fail | Fail |
| OS-U 4 wk | 0 | Fail | 0 | 0 | Fail | Fail | Fail | Fail | Fail | Fail | Fail | 0 | +5 | +3 | Fail | Fail | Fail |
| OS-T 1 wk | 0 | 0 | 0 | 0 | Fail | Fail | Fail | Fail | Fail | Fail | Fail | 0 | 0 | 0 | Fail | Fail | Fail |
| OS-T 2 wk | 0 | 0 | 0 | 0 | Fail | Fail | Fail | Fail | Fail | Fail | Fail | 0 | 0 | 0 | Fail | Fail | Fail |
| OS-T 3 wk | 0 | 0 | 0 | 0 | Fail | Fail | Fail | Fail | Fail | Fail | Fail | 0 | 0 | 0 | Fail | Fail | Fail |
| OS-T 4 wk | 0 | 0 | 0 | 0 | Fail | Fail | Fail | Fail | Fail | Fail | Fail | 0 | 0 | 0 | Fail | Fail | Fail |

Footnote:
*= too gassy to test.

An exemplary embodiment of the invention relates to: compositions comprising at least one aqueous dispersion of (1) at least one emulsion copolymer polymerized from (a) at least one ethylenically unsaturated anionic monomer and (b) at least one other olefinically unsaturated monomer, said copolymer being made using at least one phosphate surfactant having at least one phosphorus acid group or salt thereof, said copolymer optionally being crosslinked, and (2) at least one non-water soluble metal pigment. The compositions are useful in paints and other coatings.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention.

What is claimed is:

1. A composition comprising:
An aqueous dispersion of (1) at least one emulsion copolymer polymerized from (a) at least one ethylenically unsaturated anionic monomer and (b) at least one other olefinically unsaturated monomer, said monomers being polymerized in the presence of at least one phosphate ester surfactant having at least one phosphate group or salt thereof, said copolymer optionally being crosslinked, and (2) at least one non-water soluble metal pigment.

2. A composition of according to claim 1, wherein said ethylenically unsaturated anionic monomer is selected from include acrylic acid, methacrylic acid, crotonic acid, itaconic acid, furnaric acid, maleic acid, rnonomethyl itaconate, monomethyl fumarate, monobutyl fumarate, maleic anhydride, 2-acrylamido-2-methyl-1-propanesulfonic acid, sodium salt of 2-acrylamnido-2-methyl-1-propanesulfonic acid, ammonium salt of 2-aciylamnido-2-methyl-1-propanesulfonic acid, sodium vinyl sulfonate, sodium salt of allyl ether sulfonate, phosphoethyl methacrylate, vinyl phosphonic acid, allyl phosphonic acid; and salts thereof; and mixtures thereof.

3. A composition according to claim 1, wherein said other olefinically unsaturated monomer is selected from alkyl acrylates or mnethacrylates having from 1 to 10 carbon atoms in the alkyl moiety, glycidyl methacrylate, glycol mono- or diacrylates, glycol mono and dimnethacrylates, aromatic vinyl compounds, vinyl halides, vinylidene chloride, $C_1$-$C_{12}$ vinyl esters, vinyl pyridine, N-vinyl pyrrolidone, N,N'-dimethylamino (meth)acrylate, chloroprene, acrylonitrile, methacrylonitrile; ethylenically unsaturated monomers having amine-reactive, carbonyl-functional groups; allyl-, vinyl-, and crotyl- esters of acrylic, methacrylic, maleic, and fumnaric acids, di- and tri-(mneth)acrylates, divinylbenzene, diallylphthalate, triallylcyanurate, polyvinyl ethers of glycols, glycerols; and mixtures thereof.

4. A composition according to claim 1, wherein said phosphate ester surfactant is selected from mono- and di- phosphate esters of nonyl phenol ethoxylates, phosphate esters of tridecyl alcohol ethoxylates, phosphate esters of isodecyl alcohol ethoxylates, phosphate esters of aromatic ethoxylates, phosphate esters aliphatic ethoxylates, phosphate esters of $C_{10}$–$C_{16}$ alkyl ethoxylates/propoxylates; and mixtures thereof.

5. A composition according to claim 1, wherein said non-water soluble metal pigments are selected from aluminum, zinc, silver, copper, and alloys thereof.

6. A composition according to clalin 5, wherein said metallic pigment is in flake or powder form.

7. A composition according to claim 6, wherein said pigment is aluminum flake.

8. A composition according to claim 3, wherein said olefinically unsaturated monomer is selected from diacetone acrylamide, (meth)acryloxyalkyl benzophenone, (meth)acrolein, crotonaldehyde, 2-butanone(meth)acrylate, vinyl acetoacetate, acetoacetoxyethyl (meth)acrylate, acetoacetoxypropyl (meth)acrylate, allyl acetoacetate, acetoacetoxybutyl (meth)acrylate, 2,3 -di(acetoacetoxy)propyl (meth)acmylate, vinyl acetoacetamide, acetoacetoxyethyl (meth)acrylarnide; and mixtures thereof.

9. A composition according to claim 8, wherein said at least one emulsion copolymer is crosslinked with a nitrogen-containing crosslinking agent having at least two amine nitrogens.

10. A composition according to claim 9, wherein said crosslinking agent is selected from ethylenediamine, propylenediamine, tetramethylenediamine, pentamethylenediamine, hexamethylenediamine, piperazine, anminoethylpiperazine, diethylenetriamine, triethylenetetrainine, tetraethylenepentamine, cyclohexyldiamine, isopheronediamine, triaminoethylamine, diaminoethanolamine, phenylenediarnine, biphenyldiamine, hydrazine, aliphatic dihydrazines having from 2 to 4 carbon atoms, alkylene dioxime ethers, and water soluble dihydrazides of dicarboxylic acids.

11. A composition according to claim 1, further comprising co-solvents, pigments, fillers, dispersants, wetting agents, anti-foam agents, rheology modifiers, pH control agents, UV absorbers, antioxidants, biocides, stabilizers; and mixtures thereof.

12. A method for making a pigmented aqueous dispersion comprising:
(a) providing an emulsion copolymer polymerized from (i) at least one ethylenically unsaturated anionic monomer and (ii) at least one other olefinically unsaturated monomer in the presence of at least one phosphate ester surfactant having at least one phosphate group or salt thereof; and
(b) combining said copolymner with at least one non-water soluble metal pigment.

13. A method according to claim 12, wherein said ethylenically unsaturated anionic monomer is selected from include acmylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium salt of 2-acrylamido-2-methyl-1-propanesulfonic acid, ammonium salt of 2-acrylamido-2-methyl-1-propanesulfonic acid, sodium vinyl sulfonate, sodium salt of allyl ether sulfonate, phosphoethyl methacrylate, vinyl phosphonic acid, allyl phosphonic acid; and salts thereof and mixtures thereof.

14. A mnethod according to claim 12, wherein said other olefinically unsaturated monomer is selected from alkyl acrylates or methacrylates having from 1 to 10 carbon atoms in the alkyl moiety, glycidyl methacrylate, glycol mono- or diacrylates, glycol mono and dimethacrylates, aromatic vinyl compounds, vinyl halides, vinylidene chloride, $C_1$–$C_{12}$ vinyl esters, vinyl pyridine, N-vinyl pyrrolidone, N,N'-dimethylamino (meth)acrylate, chloroprene, acrylonitrile, methacrylonitrile; ethylenically unsaturated monomers having amine-reactive, carbonyl-functional groups; allyl-, vinyl-, and crotyl- esters of acrylic, methacrylic, maleic, and fumaric acids, di- and tri-(meth)acrylates, divinylbenzene, diallylphthalate, triallylcyanurate, polyvinyl ethers of glycols, glycerols; and mixtures thereof.

15. A method according to claim 12, wherein said phosphate ester surfactant is selected from mono- and di- phosphate esters of nonyl phenol ethoxylates, phosphate esters of tridecyl alcohol ethoxylates, phosphate esters of isodecyl alcohol ethoxylates, phosphate esters of aromatic ethoxylates, phosphate esters aliphatic ethoxylates, phosphate esters of $C_{10}$–$C_{16}$ alkyl ethoxylates/propoxylates; and mixtures thereof.

16. A method according to claim 12, wherein said non-water soluble metal pigments are selected from aluminum, zinc, silver, copper, and alloys thereof.

17. A method according to claim 16, wherein said metallic pigment is in flake or powder form.

18. A method according to claim 17, wherein said pigment is aluminum flake.

19. A method according to claim 12, wherein said copolymer is crosslinked.

* * * * *